Figure 1:
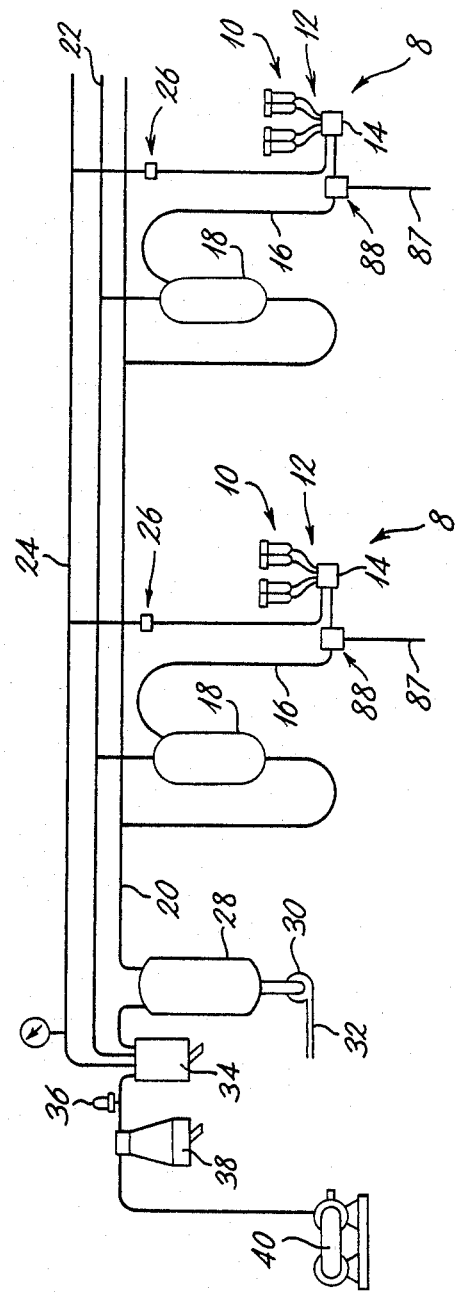

United States Patent [19]

Griffin et al.

[11] Patent Number: 4,803,950
[45] Date of Patent: Feb. 14, 1989

[54] AUTOMATIC MILKING APPARATUS

[75] Inventors: Tony K. Griffin, Wokingham; Robert J. Grindal, Reading; Barry R. Marshall, Ramsden, all of England

[73] Assignee: National Research Development Corporation, London, England

[21] Appl. No.: 170,646

[22] Filed: Mar. 16, 1988

Related U.S. Application Data

[63] Continuation of Ser. No. 933,335, Nov. 20, 1986, abandoned, which is a continuation of Ser. No. 738,650, May 28, 1985, abandoned.

[30] Foreign Application Priority Data

May 31, 1984 [GB] United Kingdom ................ 8413861
Dec. 6, 1984 [GB] United Kingdom ................ 8430804

[51] Int. Cl.$^4$ ............................................. A01J 5/04
[52] U.S. Cl. .................................................. 119/14.55
[58] Field of Search ............... 119/14.02, 14.32, 14.37, 119/14.38, 14.54, 14.55

[56] References Cited

U.S. PATENT DOCUMENTS

| 2,702,526 | 2/1955 | Torgerson | 119/14.55 |
| 3,014,455 | 12/1961 | Olander | 119/14.54 |
| 3,029,786 | 4/1962 | Gillette et al. | 119/14.55 |
| 4,280,445 | 7/1981 | Phillips | 119/14.02 |
| 4,395,972 | 8/1983 | Griffin | 119/14.55 |
| 4,441,454 | 4/1984 | Happel et al. | 119/14.36 |

FOREIGN PATENT DOCUMENTS

| 1053853 | 3/1959 | Fed. Rep. of Germany . |
| 152498 | 10/1970 | New Zealand . |
| 394983 | 7/1933 | United Kingdom . |
| 1397693 | 6/1975 | United Kingdom . |
| 1451995 | 10/1976 | United Kingdom . |
| 2099677A | 12/1982 | United Kingdom . |

Primary Examiner—Robert P. Swiatek
Attorney, Agent, or Firm—Cushman, Darby & Cushman

[57] ABSTRACT

The method of automatic milking comprising the step of drawing the milk from the teat past one or more non-return valves without the introduction of air into the milk flow upstream of the valve or valves. An automatic milking apparatus for carrying out the method comprises one or more one-way clawpieces and pneumatically-isolated teat liners.

6 Claims, 3 Drawing Sheets

AUTOMATIC MILKING APPARATUS

This is a continuation of application Ser. No. 933,335, filed Nov. 20, 1986, which was abandoned upon the filing hereof, which was a continuation of Ser. No. 738,650, filed May 28, 1985, now abandoned.

The present invention relates to automatic milking apparatus.

The basic components of a milking installation, at least as far as the present invention is concerned, are (1) a cluster of four teat cups including (2) a clawpiece, (3) a suction pump and (4) a pulsator.

Each teat cup comprises a rigid outer casing containing a flexible liner which fits over one of the cow's teats. A pressure of approximately 50 kPa below atmosphere is continuously applied to the "core" space enclosed by the liner. Apart from encouraging a flow of milk into the core space, this negative pressure is also effective to clamp the teat liner on to the teat—this is referred to as "adhesion".

The pressure applied to the annular space between the liner and the rigid casing alternates, however, between 50 kPa below atmosphere and atmosphere thanks to the action of the pulsator. At the first of these values, there is zero pressure differential across the liner and milk is sucked from the teat into the core space. This milk passes down a flexible "short milk" tube into one of the four tubular inlet "nipples" projecting upwardly from the interior volume of a special junction unit called a "clawpiece". From there the milk is drawn down through an outlet nipple and via a "long milk" tube to an appropriate receptacle or pipeline. The other three nipples of the clawpiece are connected to similar teat cups and thence to the other teats of the cow's udder.

It will be appreciated that in operation of the cluster, the passage of milk from the teats is intermittent. Thus in a complete pulsation cycle, as the pulsation chamber is re-evacuated from the completely collapsed condition, say, the liner in contact with the teat widens and the size of the teat sinus increases. Simultaneously the liner begins to open beneath the teat and, when sufficiently open, milk starts to flow through the streak canal. Continued expansion of the streak canal and opening of the liner follows until the liner is fully open. Milk begins flowing from the teat when the liner is about half open and continues until the liner is about half closed. The teat sinus has already become somewhat smaller by this time and the region of the compressed streak canal appears elongated due to complete collapse of the liner on the teat. As the liner closes, milk flow ceases before complete collapse beneath the teat, indicating clearly that cessation of milk flow is not caused by the liner cutting off the vacuum to the end of the teat but by the force exerted by the closing liner itself. The cycle then repeats, the next flow of milk beginning when the liner is again about half open.

Clearly in any such system, there must be some mechanism for partially releasing the vacuum within the fully collapsed liner in order that it can return towards its partially and later fully open state. Otherwise, the liner, once collapsed will remain so throughout the subsequent pulsation cycles.

Where the design of clawpiece is such that it will allow milk flow in both directions through the clawpiece, the liner vacuum can be released if desired by allowing some of the milk to flow back up the short milk tubes into the liner core. It is normally preferred, however, to allow air to enter the liner core at this stage and for this and other reasons an appropriate air bleed is invariably provided somewhere in the cluster.

Where a so-called "one-way" clawpiece is used, i.e., one allowing a downward flow of milk from the cows udder but not in the reverse direction, then it has been accepted that an air bleed must be present in the short milk tube to allow a re-expansion of the liner as above described.

The present application discloses an invention which cuts across all the accepted thinking on this subject in so far as it provides a method of automatic milking comprising the step of drawing the milk from the teat past one or more non-return valves without the introduction of air into the milk flow upstream of the valve or valves. Expressed in terms of apparatus, the present invention provides an automatic milking apparatus having one or more one-way clawpieces and pneumatically-isolated teat liners, i.e., teat liners effectively sealed during milking from any supply of air to the milk-carrying core regions of the teat liners.

At this stage, it is not understood how the teat liners of the new apparatus are able to expand from their fully collapsed state without the introduction of air or milk from a source downstream of the liners. It seems clear that the vacuum cannot be initially released by milk flowing from the teats because this milk flow only commences when the liner is already half open again.

Reverting for a moment to the prior art, it should be pointed out that apparatus has already been disclosed in GB No. 394983 and GB No. 1451995 in which the milk line from the teat includes a one-way valve and no air-bleed upstream of the valve. As the mechanism by which the method of the present invention functions is not understood, it is impossible to say whether the appliances illustrated in these documents could be operated in a similar fashion to those of the present invention or whether they would fail to operate at all. Clearly, until the advent of the present invention, the appliances as illustrated would have been dismissed out of hand as unworkable on the basis that they fail to provide any means whereby the teat liner could expand once milk flow from the teat had ceased during the milking cycle.

Returning now to the present invention, British Pat. No. 2057845B (National Research Development Corporation) envisages two types of one-way clawpiece, one with an air admission hole in the clawpiece upstream of the clawpiece valves and one in which this hole is absent and the air bleed is provided in some other part of the milking apparatus of which the clawpiece forms a part. This latter type would be an eminently suitable one-way clawpiece for use in the automatic milking apparatus of the present invention.

It is a potential drawback of the particular design of one-way clawpiece referred to above, that when milking has been completed, a small quantity of milk will remain trapped in the short milk tubes and in the clawpiece chamber. This may result in spillage when the milking cluster is removed from the cow after milking.

In an attempt to alleviate this situation, a modified version of the clawpiece is now proposed comprising control means which are effective when called into operation to allow air to enter the clawpiece upstream of the clawpiece valves. When this happens, the resulting change in pressure differential across the clawpiece valves will allow the partial vacuum present in the clawpiece chamber during milking to hold the valves away from their seats while the trapped milk flows past the valves and out through the long milk tube. Escape through the now open valve ports is substantially presented by the incoming stream of air which will persist until the vacuum in the clawpiece chamber is no longer sufficient to hold the valves open and gravity returns them to their valve-closed positions. Besides reducing the likelihood of spillage as above described, operation of the control means will also facilitate cluster removal by reducing the amount of suction present in the teat cup liners.

Conveniently the control means is arranged to be operated manually as and when desired or it may be operated as a part of an automatic cluster removal operation, e.g., by having the control means provide the attachment part for the removal apparatus.

Although it will normally be required that the control means should return to its inoperative position on release, a currently preferred design of clawpiece allows the control means to be locked in its operative position for cleaning purposes using conventional cleaning techniques e.g. circulation cleaning or acidified boiling water cleaning.

If the possibility of backflushing is required for rinsing the milking cluster between use on one cow and the next, then guide means are preferably provided within the clawpiece chamber to allow the valves to be displaced by relatively large amounts from their seats on inversion of the clawpiece, say, while guiding them back to their valve-closed positions on return of the clawpiece to its usual upright position.

According to another aspect of the present invention, an automatic milking apparatus has one or more non-return valves, pneumatically-isolated teat liners as hereinbefore defined, and control means which are effective when called into operation to allow air to enter the apparatus upstream of the non-return valves.

It would be expected that the present invention would have advantages over a milking system using other than one-way clawpieces since it avoids the flow back of milk with all its undesirable consequences both as regards milking efficiency and transfer of disease. However present indications are that the combination of one or more one-way clawpieces with an absence of air bleed also results in significant operational advantages over previous air-bled systems using one-way clawpieces. Briefly these are (i) a shorter overall milking time allowing a corresponding reduction in the size of the milking installation; (ii) less damage to the milk (less fatty acids released due to lesser agitation of milk); and (iii) "foaming" is reduced making it easier to meter and measure the milk. There is also strong evidence to show that (iv) the new cluster will lead to increased milk yield—at least for animals not accustomed to a conventional system.

The shorter milking time listed in (i) above is thought to result principally from the faster peak flow rate produced and from the shorter low flow period occurring at the end of the milking process. With prior air-bled systems, there is loss of adhesion at the end of milking and the teat cup rides up making the liner less effective and leading to a prolonged "dribble" period. With the better adhesion resulting from the present invention, ride-up is less likely to occur and the dribble period is significantly reduced. As compared with a conventional cluster, the milking time might be reduced by one minute, say, from the usual value of 5 or 6 minutes. This 20% or so reduction in milking time should allow a corresponding reduction in the amount of equipment required in the milking parlour.

Regarding point (ii) above, the damage referred to, technically known as "lipolysis", is produced by too fierce agitation of the milk which shears the fat globules in the milk and frees the fatty acids producing a bitter taste. Because of the dynamics of milk transport, lipolysis is particularly evident in milking parlour systems in which the milk is piped direct through "high lines" (i.e. above the level of cows) to a bulk tank from whence it can be emptied by the tanker. The apparatus of the present invention provides a much gentler system in which excessive agitation is for the most part avoided altogether.

Turning now to point (iii), it is envisaged that the amount of foam can be further reduced if milk is fed into the bottom of the recorder jars.

Lastly, as regards point (iv), the current trials show that the increase in milk yield, or more exactly, lactation yield, can be increased by 5% or more, especially for newly calved animals.

As well as the advantages listed above, others may become apparent in time. For example, the ability of the apparatus of the present invention to provide a substantially air-free milk flow should allow more efficient dynamic metering of the milk flow since errors arising from the usual air content in the flow will be avoided.

Throughout the specification, the term "cows" should not be narrowly interpreted but should be taken to include heifers and newly calved animals.

Figure 2:
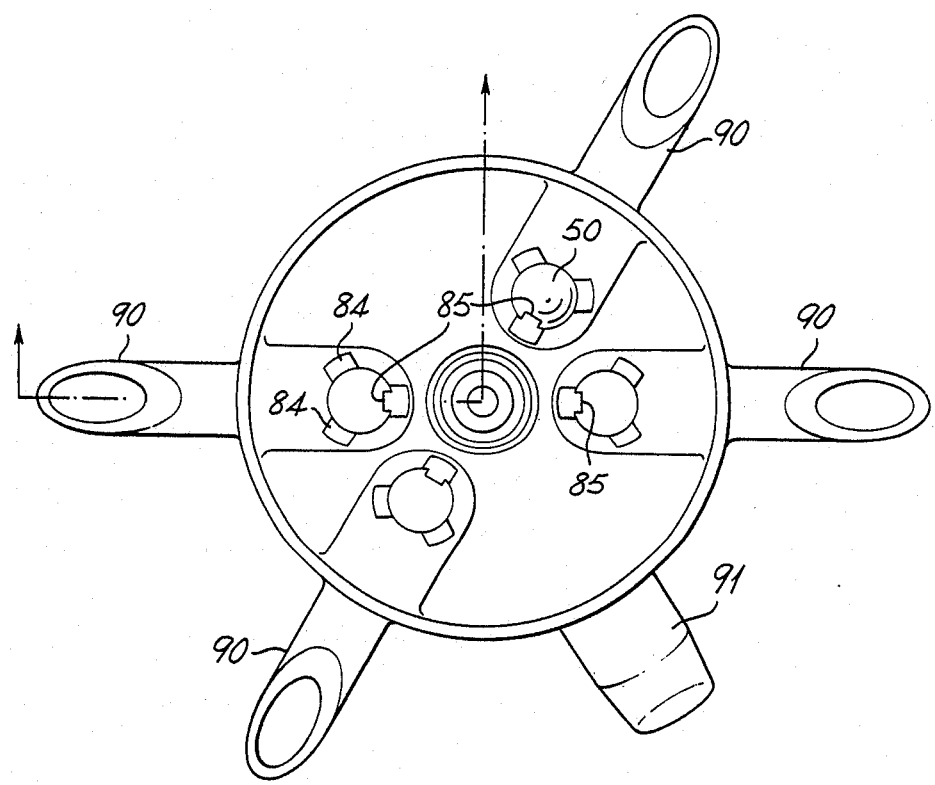
Figure 3:
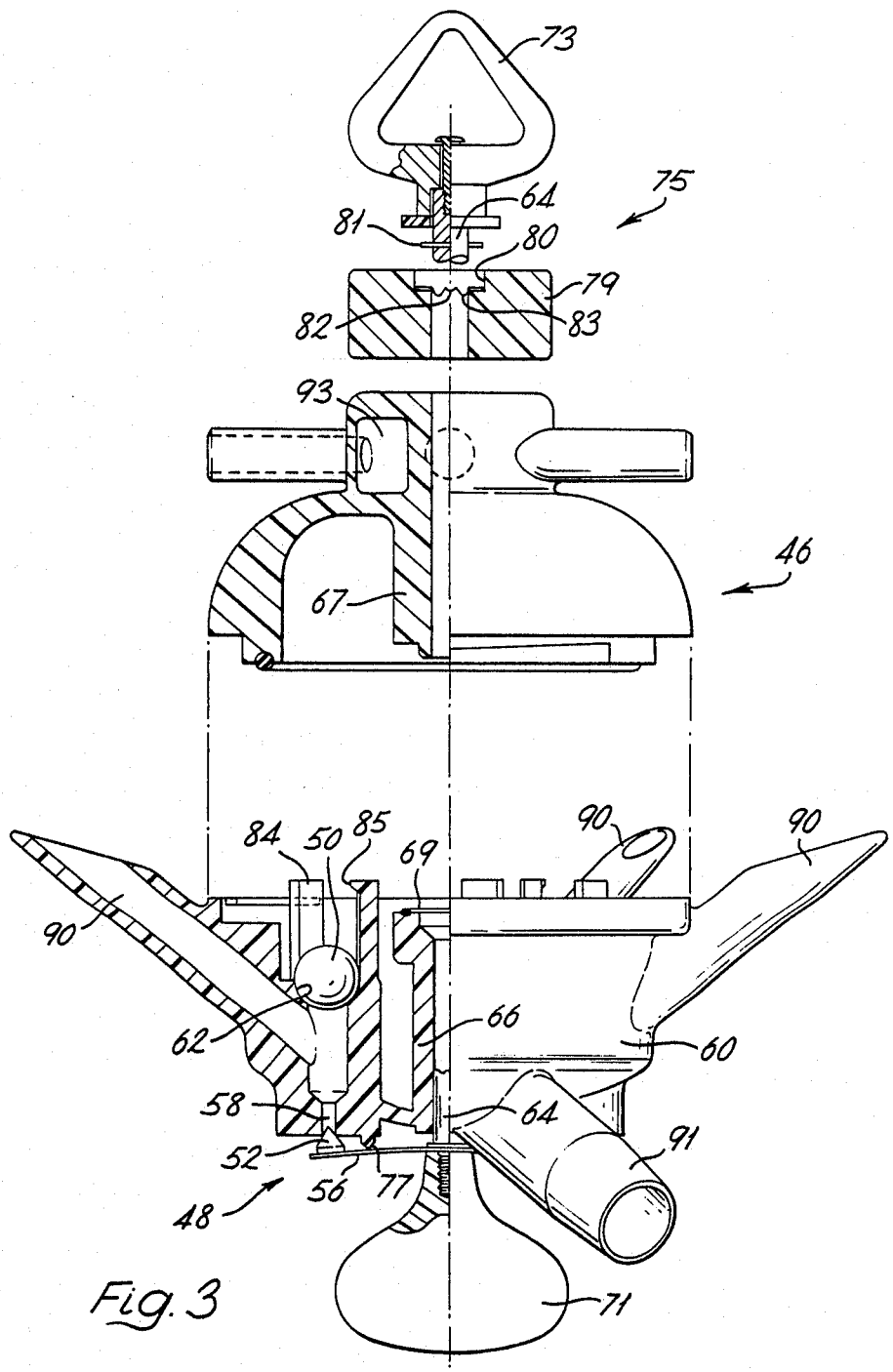

By way of example only, reference will now be made to the accompanying drawings in which FIG. 1 shows a simplified and somewhat diagrammatic view of part of a typical milking installation according to the present invention and FIGS. 2 and 3 are a plan and part-sectional exploded view of a particular design of clawpiece for use in the installation of FIG. 1.

For convenience, FIG. 1 of the drawing only shows two milking units 8 although in practice there will typically be ten or so such units in an average-sized milking installation.

Each unit 8 consists basically of four teat cups 10, a one-way clawpiece 14, e.g. of the type previously described as being suitable in the introductory portions of the specification, four short milk tubes 12 connecting the teat cups to the clawpiece, and a long milk tube 16 taking the milk from the clawpiece to a recorder jar 18 (or other milk-measuring device).

The bottoms of the recorder jars are connected to a common milk conveyance pipeline 20. In an alternative embodiment (not shown), the jars 18 (or equivalent) are omitted and the long milk tubes 16 lead directly to the common milk conveyance pipeline 20.

Reference numeral 22 indicates the milking vacuum pipeline while the reference numeral 24 indicates the air line for the pulsator 26.

As shown, the common milk conveyance pipeline 20 leads to a receiver vessel 28 and in operation of the installation, a milk pump 30 operates to draw milk into the vessel 28 for discharge, via pipeline 32, to a bulk tank (not shown).

The installation is completed by the usual sanitary trap 34, vacuum regulator 36, interceptor 38 and vacuum pump 40.

Although particular designs of one-way clawpiece have been referred to above, it is envisaged that other designs of one-way clawpiece may also prove satisfactory. However, it is to be understood that whatever type of one-way clawpiece is chosen, it is important that there is no air-bleed present in the clawpiece when it is in use which could destroy the overall requirement that a pneumatically-isolated passageway should be present for the flow of milk through the apparatus.

Referring now to FIGS. 2 and 3, these show a modified form of one-way ball-valve clawpiece 46 in which a control means 48 is provided for the introduction of air below each of the ball valves 50 as and when required for the purposes discussed in the introductory portions of the application.

In essence, the control means 48 comprises four upwardly-tapering rubber conical closure members 52 urged upwardly by the different arms of a cruciform spring steel member 56 to seal off the lower ends of narrow passageways 58 in the body 60 of the clawpiece. At their upper ends, the passageways 58 open out into the valve seats 62.

The centre part of member 56 is rigidly secured to a central rod 64 passing through a tubular section 66,67 which is provided in two parts formed integrally with the top and bottom parts of the clawpiece 46. The bore of section 66,67 is pneumatically and hydraulically isolated from the interior volume of the clawpiece, a washer 69 guaranteeing that there is no leakage where the two sections 66,67 join.

Upward axial displacement of the rod 64 is effected either manually by a knob 71 secured to the lower end of the rod, or by a rotationally free attachment part 73 used for automatic cluster removal at the top end of the rod, or by a rotary cam device 75 also at the top of the rod and designed to operate as will hereinafter be described. Whichever system is used in any particular instance, an upward motion of the rod from the valve-closed position illustrated in FIG. 3 will cause the arms of member 56 to bend in a pivotal motion about an appropriate one of four downwardly-tapering ribs 77 secured to the underside of the clawpiece body as shown. This in turn will cause the closure members 52 to be displaced downwardly to allow ambient air to pass up the passageways 58 to the underside of the ball valves 50 with the results already described earlier in the application.

Returning now to the cam device 75 referred to above, this comprises a knurled ring 79 having an internally-stepped central recession 80 adapted to accommodate a cross-pin 81 of the rod 64. The upper surface of this step portion comprises four pin-retaining raised sections 82 recessed at their upper ends to accept the pin and separated by four pin-retaining trough sections 83. Accordingly, rotation of the knob 79 will engage the pin either with a raised section 82 to open the closure members 52 or with a trough section 83 if the closure members are to be closed. If desired, the raised sections are alternately high and low so as to allow two degrees of opening of the closure members 52 if this is thought desirable.

Reference numeral 84 indicates guide elements for controlling the movement of ball valves 50 if the clawpiece is to be inverted for back flushing as already described and reference numerals 87 and 88 in FIG. 1 respectively indicate a water supply and valve allowing this flow of water (with or without disinfectant and/or heat) to the inverted clawpiece. As will best be seen from FIG. 2, the elements 84 are arranged in groups of three with the radially innermost element of each group provided with a ball-retaining lip 85.

Returning now to FIG. 3, the remaining reference numerals 90 and 91 indicate the usual short milk tubes and long milk tubes respectively while reference numeral 93 indicates a conventional pulsation distribution block fitted on top of the clawpiece in what has now become the usual way.

We claim:

1. An automatic milking apparatus comprising:
   a clawpiece;
   non-return valves in said clawpiece to allow flow of milk away from the teats but to inhibit milk flows in the contrary direction;
   teat-embracing surfaces presented by teat liners to the teats in use of the apparatus;
   transfer means presenting an air-tight passageway for the milk from each of said teat-embracing surfaces to a corresponding one of said non-return valves, each of said passageways being apertured for the supply of atmospheric air thereto and including valve means adapted to shut off the supply of air to each of said passageway apertures during milking; and
   control means operative at will to operate said valve means and vent said passageways to atmosphere.

2. An apparatus as claimed in claim 1 in which the control means includes a manually operable control.

3. An apparatus as claimed in claim 1 in which the control means includes means for operating the same by an automatic cluster removal assembly.

4. An apparatus as claimed in claim 1 including lock means for locking the control means in its operative position.

5. An apparatus as claimed in claim 1 including valve and retaining guide means within the clawpiece, each of said non-return valves comprising a bodily-displaceable valve member held captive within said guide means.

6. An automatic milking apparatus having at least one non-return valve, teat liners presenting teat-embracing surfaces, an air-tight passageway for the milk from each teat-embracing surface to said at least one non-return valve, surfaces defining an aperture in each said passageway for the supply of atmospheric air thereto, valve means adapted to shut off the supply of air to each said passageway aperture during milking, and control means effective when called into operation to operate each said valve means to allow air to enter each said passageway upstream of said at least one non-return valve.

* * * * *